I. P. TICE.
Spirit Meter.

No. 63,964.

Patented April 16, 1867

Witnesses
J. W. Coombs
G. W. Reed

Inventor
Isaac P. Tice

United States Patent Office.

ISAAC P. TICE, OF NEW YORK, N. Y.

Letters Patent No. 63,964, dated April 16, 1867; antedated April 5, 1867.

IMPROVEMENT IN SPIRIT-METERS.

The Schedule referred to in these Letters Patent and making part of the same.

TO ALL WHOM IT MAY CONCERN:

Be it known that I, ISAAC P. TICE, of the city, county, and State of New York, have invented certain new and useful Improvements on Spirit-Meters, of which the following is a full, clear, and exact description, reference being had to the accompanying drawing, forming part of this specification, and in which—

Figure 1:
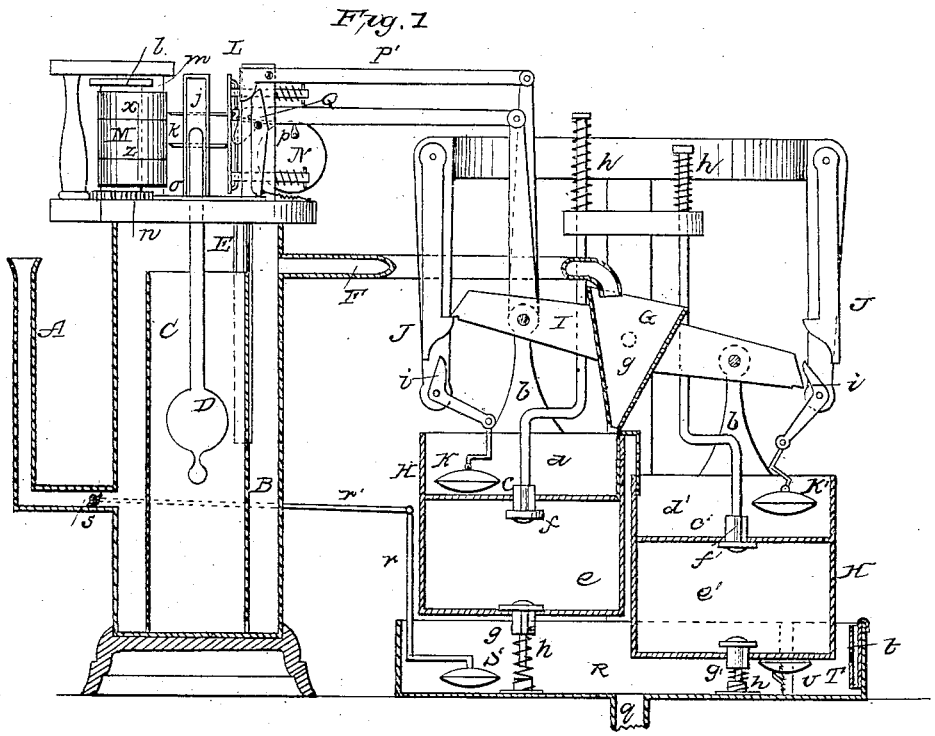
Figure 2:
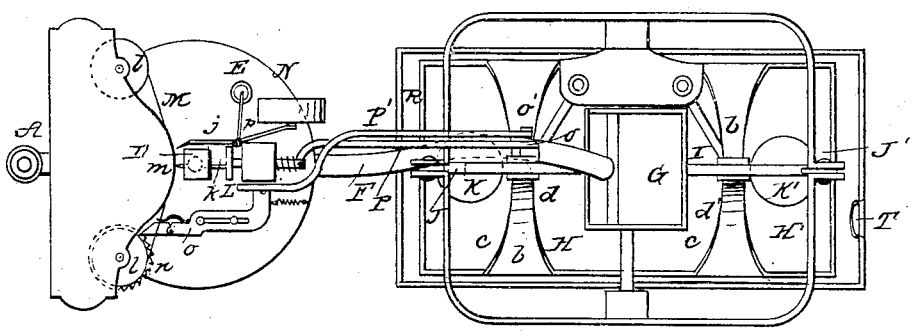

Figure 1 represents a sectional elevation of a spirit-meter constructed according to my improvement; and Figure 2, a plan of the same.

Like letters indicate like parts in both figures.

It is unnecessary to comment upon the importance of the necessity, as a matter of justice both to the distiller and the Government, of an accurate and reliable spirit-meter. In these contrivances, measuring cans, as they have before been used, that is, regulated or operated by a float resting upon the rising surface of the fluid in them, have been found inaccurate, owing to the unavoidable inequality in the supply. To obviate this inaccuracy, as well as to improve the meter in other respects, including the introduction of means to restrain tampering, as well as devices to detect any attempts at the same, and combinations to effect a more perfect register, is the object of my improvement. Accordingly, the nature of my invention consists, firstly, in a diaphragm measuring can or cans, provided with valves top and bottom, whereby there is an exact delivery, each discharge, irrespective of any surplus quantity that may be run into the cans; also, in a certain combination of devices with the cans, to automatically adjust themselves in succession to the supply, or the latter to the cans, including an elastic action of the valves; likewise, in the arrangement within a vessel in the meter of a detector, operated by the rising fluid, and made to register or chronicle any attempt at tampering with the meter; also, in a check-valve, similarly operated, and arranged so as to cut off supply from the still and through the meter should the latter be tampered with; and in a novel combination of register, indicating the quantity passed through the meter in a certain time, hydrometric register, chronicling the specific gravity of the spirit each can discharge, and thermometric register, similarly recording its temperature, from which combination a perfect register of the amount of spirit, at a given or average proof, passed through the meter, is, or may be, obtained.

The following description, with reference to the accompanying drawing, will show how this, my invention, is, or may be, carried into practice.

The meter is, of course, designed to be boxed or cased in under lock, the spirit being conveyed to it from the still by an induction pipe, of which A represents a part or connection. B is an outer cylinder, into which the spirit may be first passed by the pipe A, and from thence into an inner cylinder, C, by apertures near the bottom. Within the inner cylinder C, as being better protected from turbulent action of or by the incoming liquid, I arrange the hydrometer D, while a thermometer, E, is, or may be, disposed within the outer cylinder. F is an eduction pipe, which serves to convey, it may be in a continuous stream, the liquid or spirit from the cylinder B to a hopper, G. This hopper is hung on a horizontal rock-shaft, $a$, supported in suitable side frames, and is arranged, when occupying a vertical position, so that its mouth is midway over cans H H', which have alternately, at intervals, an up-and-down movement, that is produced automatically by the action of the liquid, as will be hereinafter explained, and which movement is, or may be, made to tilt the hopper G, so as to cause it to deliver first into the one can, and then into the other, by, say, connecting the cans through side arms $b$ with a cross-beam, I, attached to the hopper or its rock-shaft. Each of the cans H H' is provided, at a suitable distance from its top, with a diaphragm, $c$, so as to divide the cans into upper and lower chambers $d\,e$ and $d'\,e'$. The upper chambers, $d\,d'$, may be open at their tops, while the lower ones, $e\,e'$, form close cubes or spaces, into which the spirit is passed and discharged from by valves $f\,g$ and $f'\,g'$, and the cubical contents or capacities of which lower chambers constitute fixed quantities of a measurement, the two cans corresponding to the discharge required to be recorded by the register. These fixed quantities, when once the cans are gauged or set, are invariable and altogether irrespective of the copiousness of the supply, as will be more clearly explained by the description which follows. The valves $f\,f'$ and $g\,g'$ are arranged to open inwardly within the chambers $e\,e'$, the first-named ones downwardly, and the last-mentioned ones upwardly, therein, and have an elastic cushion or bearing by springs $h$ arranged round their stems or otherwise. These spring bearings are not simply for the purpose of giving a tight fit to the valves against their seats in the cans as the latter are moved up or down, but both to secure a tight fit, and admit of said cans being alternately sufficiently elevated to raise the end of the arm of the beam I, lying over the raised can, a trifle above the tooth of a pendent catch, J or J', so as to insure, on such raised can settling, the gear or lock of the raised end of the beam with its pendent catch, both cans being similarly held, when alternately raised, by the pendent catches J J' locking alternately with the ends of the beam I. Now, supposing the liquid or spirit to be running from the hopper G into the raised can H, it is allowed to run so as to not only fill the measuring cube or chamber $e$, but also, more or less, the space $d$ above the diaphragm $c$, the valve $f$ remaining open, the valve $g$ closed, and the end of the beam I lying over said can, locked by the catch J. Whilst this filling of the one can H is taking place, the other and depressed can H' is supposed to be emptying, or to have emptied, itself, its lower valve $g'$ having been opened, and upper valve $f'$ closed, by said can in falling when released from its elevated support by the pendant J' that serves to hold the other end of the beam I. After, however, a certain quantity of liquid has run into the can H, so as to have sufficiently elevated within its upper space $d$ a float, K, the latter causes an arm or toe, $i$, to move back the pendent catch J, and so release the can H, which falls by the weight of its contents to discharge the latter, the other can H' simultaneously rising till locked, as described, by its pendent catch, and remaining elevated till a float, K', and toe, $i'$, relieve it by the action of the liquid, similar to that which took place in the filling of the other can H, that, in filling, tilts the hopper G over the can H' to fill it, the open or closed condition of the valves $f$ $f'$ and $g$ $g'$ being reversed to that previously described and represented in the drawing. Thus an alternate filling and discharge of the cans and tilting of the hopper is automatically produced; and as no more than the cubical contents of the lower chambers $e$ $e'$ can ever be discharged from the cans, although a surplus may, and is designed to, remain within the upper spaces $d$ $d'$, the quantity discharged, each delivering action of the cans, must of necessity be equal and regular, and thus a correct register may be kept.

Connected, either directly or indirectly, with the cans or other mechanism set in motion by the liquid as it measures or discharges itself, say with the beam I, are devices for effecting the register. Thus the thermometer E, which may be of any suitable description, the mercury in which is made to act upon a piston, or its equivalent, that, accordingly as the temperature of the liquid in the cylinder B varies, is made to raise or lower a needle, $j$, made capable of sliding vertically on a rod of a spring-borne presser, L, and hydrometer D, which also carries a needle, $k$, the rise and fall of which varies with the specific gravity of the spirit, may both be made to indicate, on a travelling, endless register card, M, by pricking or marking it as it moves, the precise specific gravity and temperature of the liquid or spirit each can or double-can discharges, and the quantity in the cans be at the same time registered, all by devices connected, directly or indirectly, with the working of the cans. The register card M may have standard lines $x$ $z$ ruled upon it, on, above, or below which, accordingly as the needles $j$ $k$ are made to prick it, may, by a system of equation, an average be struck of the temperature and specific gravity of the liquid passed through the meter in a given time, or for a given quantity. Said card M is shown as passed round vertical drums $l$, and as travelling over a fixed block, $m$. This card is also set in motion each can or double-can discharge, as is likewise a disk indicator, N, for registering the number of cans discharged. The form of the several indicators or registers and mode of working them may be variously modified, but the peculiarity of this part of my invention still be maintained, which peculiarity or novelty consists not in any one or two of these contrivances, or of any peculiarity in them of themselves, but in the combination of such or equivalent devices, operated automatically by the passage of the liquid through the meter, whereby the several quantities of spirit passed through the meter are recorded, and the specific gravity and temperature of each quantity likewise registered, so that an exact measure at a given strength is at any time ascertainable. This may be done by a rod, $o$, attached to the beam I, and operating a lever, P, that urges the presser L to work the needles $j$ $k$ against the card M each descent of one end of the beam I, that also, by means of another rod $o$, acting upon a lever, P', which operates a spring-held lever, Q, serves once each double motion of the beam to set in motion the register card M, by a ratchet-wheel, $n$, attached to one of the drums $l$, and worked by a pawl-rod, $o$, that, in its turn, is actuated by the lever Q. The disk or other indicator N, that records the number of cans delivered by or through the meter, may be of ordinary indicator construction, and be set in motion, so as to count one each double action of the beam I, by a rod, $p$, connected with the presser L, or with other suitable moving portion of the mechanism.

I now proceed to describe that part of my invention which has for its object the prevention of tampering with the meter, and of recording any attempt that may be made to tamper therewith. Firstly, supposing the liquid, as it is delivered from the cans, to pass into a trough, R, provided with a general discharge aperture, $q$, then might the meter be tampered with by plugging said aperture, or interfering with the free discharge therefrom, or pipe it connects with, so as to flood the meter. This may be provided against by arranging within the said trough, or it might be any other vessel within the meter that an undue rise of the liquid would produce a like result, a device that, on the liquid not passing off freely as it should, and rising in the trough or eduction passage to flood the meter, will, by such action of the fluid, at once close the induction, so as to prevent any more liquid or spirit from entering the meter. This device may consist of a float, S, operating a rod, $r$, and lever, $r'$, that are made to control a throttle or other valve, $s$, in the induction pipe A, so as to close said pipe whenever the liquid in the trough exceeds its proper level. The same principle of action is, or may be, applied to detect or record any attempt at tampering with the meter, that is, by combining with a vessel within the meter a detector, arranged within said vessel, and operated by the undue rise of the fluid therein. The detector itself may be variously constructed, and so as to record either by deposit of liquid where it should not be, change of position, or discoloration, or other mark or sign, as, for instance, it might be a pocket, T, attached to the side of the trough R, and with a perforation, $t$, in it at such a height above the proper level in the trough at which the liquid would stand in the regular working of the meter as not to receive any of the spirit through it, but on any attempt to tamper with the meter, and undue rise of the liquid in the trough, then the liquid or spirit would enter the opening $t$, and be deposited in the pocket, which, accordingly, would record the attempt made, even though the tampering should not be proceeded with beyond the attempt; or, a float, U, set in spring gear, with a ratchet-rack to a certain level, and working and remaining above such level on any undue rise of the liquid, might be used instead of the pocket. In fact such detector, whether stationary or movable, and whatever its mark or sign, even if only discoloring paper or water by an undue rise of the spirit, need have no particular novelty in itself to recommend it; or, it might be an original device, if preferred.

What I claim herein as new and useful, and desire to secure by Letters Patent, is—

1. The diaphragm measuring can or cans, constructed so as to form a chamber above and below, and provided with valves to admit and discharge the liquid into and from the lower chamber of each can by the movement or action of the latter, substantially as specified.

2. In combination with the measuring or weighing cans, the valves controlling the entry and discharge of the liquid thereto or from, constructed so as to spring or yield on the cans reaching the end of their strokes, to give time and space for the locking of the raised can, essentially as herein set forth.

3. The combination of the diaphragm measuring or weighing cans, tilting hopper G, and floats K K', with locking and unlocking devices under control of the floats, substantially as specified.

4. The combination, with a liquid-meter, of a device for closing the induction or passage of liquid through the meter, so operated or set in motion automatically by the liquid in the eduction passage as to prevent tampering with the meter, essentially as herein set forth.

5. The combination, with a vessel within the meter, of a detector, arranged within said vessel, and operated by the liquid rising therein, to record any attempt at tampering with the meter, substantially as specified.

6. The combination, in a spirit-meter, of a hydrometric and thermometric register with a counter or indicator of quantities, for operation together by the weight or action of the liquid, or other motor, in passing through the meter, essentially as specified.

ISAAC P. TICE.

Witnesses:
    J. W. COOMBS,
    G. W. REED.